3,397,254
CARBOXY TERMINATED POLYESTERS
PREPARED FROM TRIBASIC ACID
ANHYDRIDES AND HYDROXY TER-
MINATED POLYESTERS
John Wynstra, Bridgewater Township, and John J.
Gardikes, Somerville, N.J., assignors to Union Carbide Corporation, a corporation of New York
No Drawing. Filed Sept. 21, 1964, Ser. No. 398,038
9 Claims. (Cl. 260—835)

ABSTRACT OF THE DISCLOSURE

Carboxy terminated polyesters may be prepared from the reaction of a tricarboxylic acid anhydride with an hydroxy terminated polyester which in turn is the reaction product of a cyclic dicarboxylic acid or anhydride and a polyol. These polyesters may be combined with polyepoxides to form thermosetting compositions.

---

The tribasic acid anhydrides are exemplified by hemimellitic acid, and trimellitic acid. The polyols may include glycols, phenols, cycloaliphatic diols and ether diols.

In an example 1,489 g. of propylene glycol were condensed with 2,791 g. of isophthalic acid. To form an hydroxy terminated polyester. 3,701 g. of this polyester were reacted with 803.5 g. of trimellitic acid anhydride to form the carboxy terminated polyester. This polyester was then combined with a polyglycidyl ether of 2,2-bis-(p-hydroxy phenyl)propane.

This invention relates to polyesters and to thermosetting compositions based thereon. More particularly, this invention relates to carboxyl terminated polyesters and to thermosetting compositions based thereon which cure to thermoset products characterized by excellent chemical physical properties.

The present invention provides thermosetting compositions comprising polyepoxides having an epoxy equivalency of greater than one and a carboxyl terminated polyester which, upon being cured, thermoset to rigid products characterized by excellent resistivity to chemicals such as toluene and ammonium hydroxide and which are characterized by excellent mar-proofness, adhesion to metal, toughness and impact strength. The compositions of this invention, by reason of their physical and chemical properties, as described, find wide utility as protective coatings on surfaces such as metal and the like; and as binders for structural laminates.

The carboxyl terminated polyesters of this invention have more than 2 carboxyl groups per molecule and are the reaction products of an anhydride of a tricarboxylic acid and a hydroxyl terminated polyester which, in turn, is the reaction product of a dicarboxylic cyclic acid or anhydride thereof and a dihydric compound.

Illustrative of suitable dibasic cyclic acids are those having the general formula:

$$R(COOH)_2$$

wherein R is a cyclic hydrocarbon radical having at least 4 carbon atoms, generally 6 carbon atoms to 20 carbon atoms inclusive and preferably 6 carbon atoms to 12 carbon atoms inclusive. Among such dibasic cyclic acids are included phthalic acid, isophthalic acid, terephthalic acid, halogen substituted phthalic acids, alkyl substituted phthalic acids wherein the alkyl substituent can be exemplified by methyl, ethyl, n-propyl and the like, dicarboxyl naphthalenes, cyclobutane dicarboxylic acids, cyclopentane dicarboxylic acids, cyclohexane dicarboxylic acids, bicycloheptane dicarboxylic acids and the like.

Among suitable dihydric compounds, for purposes of this invention, are the following: dihydric hydrocarbon compounds having the general formula:

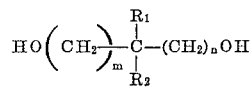

wherein the sum of $m+n$ is at least 1, preferably 1 to 20 inclusive and $R_1$ and $R_2$, which can be the same or different are hydrogen or alkyl preferably containing from 1 to 20 carbon atoms inclusive. Specific compounds include, among others, ethylene glycol, propylene glycol, butanediol-1,2, butanediol-1,3, butanediol-1,4, hexanediol-1,6, decanediol-1,10, neopentyl glycol and the like. Also suitable are the ether diols having the general formula:

$$HO(C_aH_{2a}O)_xH$$

wherein $a$ has a value of at least 1, preferably 2 to 6 inclusive and $x$ has value of at least 2, preferably 2 to 10 inclusive. Compounds falling within this formula are exemplifiied by diethylene glycol, dipropylene glycol, triethylene glycol, and the like. In addition to the aliphatic dihydric compounds noted, dihydric aromatic compounds can also be used. Such dihydric aromatic compounds are illustrated by the dihydric phenols subsequently referred to in this application. Also suitable are dihydric cycloaliphatic compounds such as cyclohexane dimethanol and the like.

Among suitable tribasic acid anhydrides are the anhydrides of aliphatic tribasic acids such as tricarballylic acid and the like; the anhydrides of the aromatic tribasic acids such as hemimellitic acid, trimellitic acid and the like; the anhydrides of the cycloaliphatic tribasic acids such as $\Delta^4$-3-carboxy-6-methyl tetrahydrophthalic acid and the like as well as the anhydrides of the alkyl and halogen substituted tribasic acids.

The carboxyl terminated polyesters are prepared in a two stage reaction process. In the first stage, the dihydric compound is reacted with the dibasic cyclic acid to produce a hydroxyl terminated polyester. This reaction can be exemplified by the equation which follows wherein, for purposes of illustration, the reactants are propylene glycol and isophthalic acid.

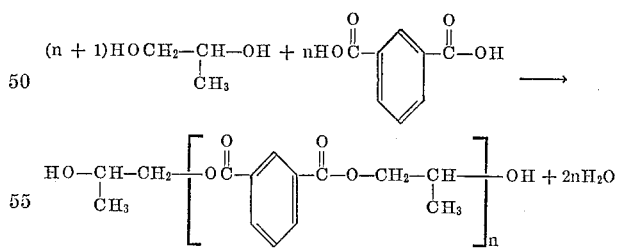

After completion of the reaction between the dihydric compound and the dibasic cyclic acid to produce a hydroxyl terminated polyester, generally having a DP of at least about 3 generally about 3 to about 25 and preferably a DP of about 5 to about 12, this polyester is reacted with a tribasic acid anhydride to produce a carboxyl terminated polyester. The preparation of the carboxyl terminated polyester can be illustrated by the following equation wherein a hydroxyl terminated polyester, prepared by reacting propylene glycol and isophthalic acid, is reacted with trimellitic anhydride.

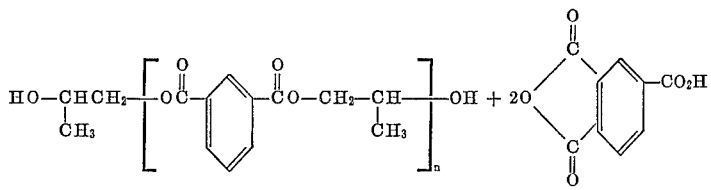

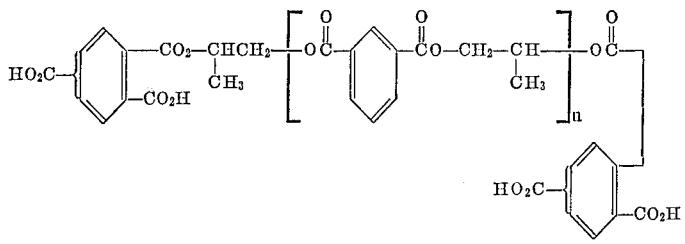

In the discussion that follows it is to be understood that statements about "dibasic cyclic acids" apply equally as well to anhydrides thereof.

In producing the hydroxyl terminated polyesters, the reactants are admixed in amounts such that the dihydric compound is present in greater than stoichiometric amounts. As a rule, at least about 4 percent in excess of stoichiometric is employed in order to insure that the polyester which is produced is terminated by hydroxyl groups. Amounts greater than about 4 percent in excess of stoichiometric can be used if so desired. For purposes of stoichiometric calculations, one carboxyl group is deemed to react with one hydroxyl group.

Generally, the reaction between the dihydric compound and the dibasic cyclic acid is conducted by admixing the two reactants and heating the reaction mixture to elevated temperature, generally about 160° C. to about 250° C., preferably to a temperature of about 200° C. to about 220° C.

The reaction between the dibasic cyclic acid and the dihydric compound is usually conducted in the presence of an inert water-immiscible organic diluent. The diluent serves as a convenient medium in which to conduct the reaction and also serves to help maintain the temperature of the reaction within the limits previously specified. Illustrative of suitable diluents are the following, xylene, toluene, benzene, chlorobenzene, octane and the like.

The carboxyl terminated polyesters are prepared by reacting the hydroxyl terminated polyesters with a tribasic acid anhydride. The reactants are admixed in amounts such that the polyester produced is terminated by carboxyl groups and has a carboxyl functionality of more than 2. It is customary to heat the reactants to a temperature of at least about 100° C. in order to initiate the reaction. After the reaction is initiated, the exotherm developed sustains the reaction. Generally, the carboxyl functionality of the polyesters is about 3 to about 6. Polyesters having a carboxyl functionality in exccess of about 6 can be used but little is to be gained by exceeding a nominal functionality of about 6. The caboxyl terminated polyesters have the same DP as the hydroxyl terminated polyester from which they are derived.

Carboxyl functionality as used herein is the numerical value of the number of free carboxyl groups per average molecule of polyester.

The DP that is, the degree of polymerization of the polyester is calculated from the concentration of the end group (carboxyl or hydroxyl), determined by analysis.

$$DP = \frac{\text{molecular weight}}{\text{weight of the repeating unit}}$$

$$\text{Molecular weight} = \frac{Q \times 10^3}{[AN]+[OH]}$$

$Q$ = number of terminal hydroxyl or carboxyl groups
$[AN]$ = acid value in meq./gram
$[OH]$ = hydroxyl value in meq./gram It is also to be pointed out that in preparing the polyesters of this invention small amounts of trihydroxy compounds can be used in conjunction with the dihydric compounds and reacted with the dibasic cyclic acids. This reaction mixture can also contain small amounts of dibasic aliphatic acids such as adipic acid and the like. In addition, when reacting the hydroxyl terminated polyesters with a tribasic acid anhydride, the reaction mixture can also contain small amounts of dibasic acid anhydride such as phthalic acid anhydride and the like.

The dibasic compounds are used when it is desired to lower the carboxyl functionality while the trihydroxy compounds are used in order to increase the carboxyl functionality.

It is to be understood that mixtures of reactants noted herein can be used if so desired.

The importance of preparing the carboxyl terminated polyesers by a two stage reaction process is evidenced by the fact that on attempting to prepare a carboxyl terminated polyester by reacting a mixture containing a dibasic cyclic acid, a dihydric compound and a tribasic acid anhydride, the resultant product is a nondescript, nonhomogeneous mass. This is further evidenced that on admixing propylene glycol, isophthalic acid and trimellitic acid anhydride in the same equivalent proportions as set forth in Example 1 of this application, a homogeneous product could not be made.

The compositions of this invention are formulated by simply admixing the carboxyl terminated polyester with the polyepoxides. Once formulated, the compositions are thermoset by subjecting them to temperatures in excess of about 60° C., generally about 130° C. to about 180° C. The actual temperatures used and the duration of each curing cycle will depend upon the formulation of each composition. Room temperature curing takes a number of days.

The carboxyl terminated polyesters are admixed with the polyepoxides in amounts such that the polyester is present in about 0.5 to about 2.0 equivalents based on the carboxyl groups per equivalent of polyepoxide based on the epoxide groups.

If desired, an epoxide curing catalyst, such as benzyldimethylamine, can be added to the compositions in order to accelerate the rate of cure. Other alkaline epoxide curing catalysts can be used. Also, if desired, colorants, mold release agents, pigments and the like can be added to the compositions of the present invention. The exact material added will depend upon the end use requirements of the compositions.

The polyepoxides suitable for purposes of this invention are those organic compounds having an oxirane epoxy equivalency of greater than one, that is, compounds having an average of more than one oxirane epoxy group, i.e.,

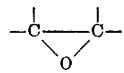

per molecule. These compounds, wherein the oxygen of the epoxy group is attached to vicinal carbon atoms, can be saturated or unsaturated, aliphatic, cycloaliphatic, or heterocyclic, and can be substituted with substituents such as halogen atoms, alkyl groups, ether groups and the like.

In further explanation of the term "epoxy equivalency" as used in this specification, it refers to the average number of epoxy groups contained in the average polyepoxide molecule. This value is obtained by dividing the molecular weight of the polyepoxide by its calculated epoxide equivalent weight. The epoxide equivalent weight is determined by heating a one gram sample of the polyepoxide with an excess of pyridinium chloride which is dissolved in pyridine. The excess pyridinium chloride is then back-titrated with 0.1 N sodium hydroxide to an end point using phenolphthalein as the indicator. The epoxide equivalent weight is calculated by considering that one HCl molecule is equivalent to one epoxide group. If the polyepoxide is a single compound and all of its epoxy groups are intact, the epoxy equivalency values will be integers of whole numbers, such as 2, 3, 4 and the like. In those instances wherein the polyepoxide is a mixture of polyepoxides or contains some monomeric monoepoxides or wherein the polyepoxide has some of its epoxy groups hydrated or otherwise reacted, the epoxy equivalency values may contain fractions, such as 1.2, 1.5, 2.5 and the like.

Illustrative of suitable polyepoxides are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al., U.S. Patent 2,506,486 and polyphenylols such as the novolak condensates of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, the heptaphenylols described in U.S. Patent 2,885,385 to A. G. Farnham. The phenols may contain substituents such as alkyl or aryl ring substituents or halogens, as exemplified by the alkyl resorcinols, tribromoresorcinol, and the diphenols containing alkyl and halogen substituents on the aromatic ring (Bender et al., U.S. Patent 2,506,486). The polyhydric polynuclear phenols can consist of two or more phenols connected by such groups as methylene, alkylene or sulfone. The connecting groups are further exemplified by bis(p-hydroxyphenyl)-methane, 2,2-bis(p-hydroxyphenyl)propane, and dihydroxydiphenylsulfone.

Process for the preparation of polyglycidyl ethers of polyhydric phenols is described in detail in the Bender et al. patent (supra) and U.S. Patent 2,943,095 to A. G. Farnham et al.

Particularly desirable for purposes of this invention are the polyglycidyl ethers of the bis(hydroxyphenyl)alkanes, for example, the diglycidyl ether of 2,2-bis(p-hydroxyphenyl)propane and the diglycidyl ether of bis(p-hydroxyphenyl)methane. Other suitable polyglycidyl ethers of polyhydric phenols are enumerated in U.S. Patent 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups, such as ethylene glycol, propane diols, butane diols, glycerine, hexane triols and the like. (Methods of preparing polyglycidyl ethers of polyhydric alcohols are described in U.S. Patent 2,898,349 to P. Zuppinger et al.).

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in detail in U.S. Patent 2,870,170 to Payne et al. Also suitable are polyglycidyl compounds produced by reacting epichlorohydrin with aromatic amines, such as aniline, 2,6-dimethyl aniline, p-toluidine, m-chloroaniline, p-aminodiphenyl, m-phenylene diamine, p-phenylene diamine, 4,4'-diaminodiphenyl methane, or with amino phenols such as p-amino phenol, 5-amino-1-n-naphthol, 4-amino resorcinol, 2-methyl-4-amino phenol, 2-chloro-4-amino phenol and the like. Specific compounds include, among others, N,N-diglycidyl aniline, N,N-diglycidyl-2,6-dimethyl aniline, N,N,N',N'-tetraglycidyl-4,4'-diamino diphenyl methane, the triglycidyl derivative of p-amino phenol wherein the amino-hydrogen and OH hydrogen atoms are replaced by glycidyl groups.

Polyglycidyl derivatives of aromatic amines and amino phenols and methods for their preparation are further described in U.S. Patents 2,951,825 and 2,951,822 to N. H. Reinking and N. H. Reinking et al., respectively. The so-called peracetic acid epoxides which are obtained by epoxidation across a double bond using peracetic acid, such as bis(2,3-epoxycyclopentyl)ether and the like are also suitable.

It is to be understood that all patents and literature references referred to in this specification are incorporated herein by reference.

In the examples which follow, which are illustrative, the tests noted therein were conducted as follows:

Mar proofness—judged by noting the force required to scratch the coating with the fingernail.

Hardness (pencil scale)—measured by noting the (drawing) pencil number which cut through the film surface when firmly drawn across the film.

Adhesion—judged by noting the force required to cut the film from the substrate.

Impact strength—Gardner impact tester.

Chemical resistance—judged by flooding the film with a given reagent nad noting the degree and speed of softening.

For purposes of convenience, the DP and carboxyl functionality of the carboxyl terminated polyesters described in examples of this application are tabulated below:

| Polyester of Example | DP | Carboxyl Functionality |
|---|---|---|
| 1 | 7.9 | 4 |
| 2 | 8 | 4 |
| 3 | 5 | 4 |
| 4 | 8 | 4 |
| 5 | 7 | 4 |
| 6 | 7.5 | 3.7 |
| 7 | 7.5 | 3.7 |
| 8 | 7.5 | 3.7 |
| 9 | 8 | 3.5 |
| 10 | 5.1 | 4 |
| 11 | 11.2 | 4 |
| 13 | 9 | 4 |

Example 1

The following charge was weighed into a 5 liter 3-necked glass flask:

|  | Grams |
|---|---|
| Propylene glycol | 1,489 |
| Isophthalic acid | 2,791 |

The flask was equipped with a stirrer, which was made up of a paddle and a glass rod, driven by an electric motor, a thermometer which reached into the contents of the flask, a nitrogen inlet and a fractionating column surmounted with a Dean-Stark water trap and a water-cooled condenser. The fractionating column served to remove the by-product water, of the esterification reaction, while keeping the glycol loss to a minimum. The fractionating column itself was made up of a reflux condenser plus a coiled condenser through which atmospheric steam was passed, allowing water to advance to the Dean-Stark trap and the propylene glycol to return to the reaction flask, that is, the glass flask.

An electric heating mantle was used to heat the reaction charge to a temperature of about 180° C., at which temperature, the reaction charge began to reflux. The rate of heating was then adjusted to avoid flooding of the fractionating column while maintaining a sufficient reflux rate to remove the water from the reaction flask. After 14 hours of heating, 513 grams of water had been collected and the temperature of the contents in the reaction flask had reached 202° C. At this point, xylene was added, slowly, through the condenser to maintain the desired reflux rate while the temperature of the contents of the flask was maintained at 215± 5° C. After another 10.5 hours of refluxing, a sample was removed for an acid value determination. The acid value was found to be 0.197 meq./g., indicating the esterification to be 97.8 percent complete. After another 5 hours of refluxing, during which time an additional 50 grams of xylene were added to the contents of the flask in order to keep the temperature within the indicated limits, the acid value was 0.04 meq./g., indicating that the esterification reaction was 99.5 percent complete. A total of 636 grams of distillate was collected (theory for water: 605 grams, the remainder 31 grams being propylene glycol).

The hydroxyl terminated polyester was a pale, brittle solid having a hydroxyl content of 1.13 meq./g. (calculated for the intended structure 1.14 meq./g.).

This hydroxyl value was used to calculate the amount of trimellitic acid anhydride required to carboxyl terminate this polyester.

To 3,701 grams of the hydroxyl terminated polyester, there was added 803.5 grams (4.18 moles) of trimellitic acid anhydride. The reaction mixture was heated, while being agitated, to a temperature of 160° C. and maintained at this temperature for one hour.

The carboxyl terminated polyester was poured hot into a pan which was lined with aluminum foil. The polyester cooled, at room temperature, to a pale brittle solid which had an acid value of 1.86 meq./g. This calculates to a combining weight of 537.6 grams per carboxyl group.

The carboxyl terminated polyester was used to prepare thermosetting compositions whose formulations are noted below. These compositions were then used to cast films of about 1.3 mils onto surfaces of glass and steel. In each instance, the films were cured by heating at 150° C. for one hour. The films were then tested as indicated below and the test results noted.

Composition A: Amount, grams
  Polyester _____ 52
  Diglycidylether of 2,2-bis(p-hydroxyphenyl)propane having an epoxide equivalent weight of about 500 _____ 48
  Xylene _____ 33
  2-ethoxyethanol _____ 33
  Polymer of ethyl acrylate/methyl methacrylate/acrylic acid in a combined weight ratio of 55:35:10 _____ 0.5
  Benzyldimethylamine _____ 0.5

Properties:
  Mar proofness _____ Excellent.
  Hardness _____ 5H on pencil scale.
  Adhesion _____ Excellent.
  Toughness _____ Excellent.
  Chemical resistance _____ Completely resistant to toluene and concentrated aqueous ammonium hydroxide.

Composition B: Amount, grams
  Polyester _____ 75
  Diglycidylether of 2,2-bis(p-hydroxyphenyl)propane having an epoxy equivalency of about 190 _____ 25
  Xylene _____ 33
  2-ethoxyethanol _____ 33
  Benzyldimethylamine _____ 0.5
  Acrylate polymer described in Composition A __ 0.5

Properties:
  Mar proofness _____ Excellent.
  Adhesion _____ Excellent.
  Toughness _____ Good.
  Chemical resistance _____ Comparable to that of Composition A.

Example 2

A hydroxyl terminated polyester was prepared in a manner described in Example 1 using the following charge:

Grams
Propylene glycol _____ 212.7
Phthalic acid anhydride _____ 355.4

The hydroxyl terminated polyester had an acid value of 0.12 meq./g. and a hydroxyl value of 1.04 meq./g.

A carboxyl terminated polyester was prepared in a manner described in Example 1 using the following charge:

Grams
Hydroxyl terminated polyester _____ 200
Trimellitic acid anhydride _____ 40

The carboxyl terminated polyester was a brittle solid having an acid value of 1.84 meq./g. This polyester was used to formulate compositions similar to Compositions A and B of Example 1, the compositions cast as films on surfaces of glass and steel and cured, in a manner as described in Example 1.

Example 3

A hydroxyl terminated polyester was prepared in a manner a described in Example 1 using the following charge:

Grams
Isophthalic acid _____ 249.2
Diethylene glycol _____ 191.0

A carboxyl terminated polyester was prepared by adding to the reacted mixture noted above, 115.3 grams of trimellitic acid anhydride.

The carboxyl terminated polyester was a viscous liquid having an acid value of 2.43 meq./g. and a combining weight of 412.

A composition was formulated using 69.4 grams of this polyester in combination with 19.5 grams of diglycidylether of 2,2-bis(p-hydroxyphenyl)propane and 0.4 gram of benzyldimethylamine. Films, cast from this composition and cured in a manner described in Example 1, had an excellent balance of toughness and hardness. That is, the films were hard without being brittle and tough without being soft. Such a combination is highly desirable since the films possess the properties of mar-proofness, resistance to scratching, resistance to dirt pick-up and resistance to chipping.

Example 4

A hydroxyl terminated polyester was prepared in a manner as described in Example 1 using the following charge:

Grams
Propylene glycol _____ 212.6
Adipic acid _____ 140.3
Isophthalic acid _____ 239.2

The hydroxyl terminated polyester had an acid value of 0.01 meq./g. and a hydroxyl value of 1.17 meq./g.

A carboxyl terminated polyester was prepared in a manner described in Example 1 using the following charge:

Grams
Hydroxyl terminated polyester _____ 466
Trimellitic acid anhydride _____ 104.8

The carboxyl terminated polyester was a soft resinous solid, melting at about room temperature, having an acid value of 1.89 meq./g.

This polyester was used to formulate compositions identical to Compositions A and B of Example 1, with the exception of the polyester. These compositions had excellent impact strength as, on being applied as film on steel surfaces and cured, easily passed the 169 inch-pound impact test.

Example 5

A hydroxyl terminated polyester was prepared in a manner described in Example 1 using the following charge:

| | Grams |
|---|---|
| Cyclohexane dimethanol | 115.4 |
| Isophthalic acid | 116.3 |

The hydroxyl terminated polyester had an acid value of 0.02 meq./g. and a hydroxyl value of 0.97 meq./g.

A carboxyl terminated polyester was prepared in a manner described in Example 1 using the following charge:

| | Grams |
|---|---|
| Polyester | 100 |
| Trimellitic acid anhydride | 38.4 |

The carboxyl terminated polyester was a soft resinous solid having an acid value of 1.63 meq./g.

Example 6

A hydroxyl terminated polyester was prepared in a manner described in Example 1 using the following charge:

| | Grams |
|---|---|
| Propylene glycol | 425.4 |
| Isophthalic acid | 797.6 |

The hydroxyl terminated polyester had an acid value of 0.162 meq./g. and a hydroxyl value of 1.07 meq./g.

A carboxyl terminated polyester was prepared in a manner described in Example 1 using the following charge:

| | Grams |
|---|---|
| Hydroxyl terminated polyester | 100 |
| Trimellitic acid anhydride | 20.56 |

The carboxyl terminated polyester was a brittle resinous solid having an acid value of 1.89 meq./g.

A composition was formulated identical to Composition A of Example 1, with the exception of the polyester, cast into films and cured, all as described in Example 1. The properties of this composition were comparable to the properties of Composition A of Example 1.

Example 7

A carboxyl terminated polyester was prepared in a manner described in Example 1 using the following charge:

| | Grams |
|---|---|
| Hydroxyl terminated polyester of Example 6 | 100 |
| Tricarballylic acid anhydride | 16.9 |

The carboxyl terminated polyester was a brittle resinous solid having an acid value of 2.03 meq./g.

A composition was formulated, using the carboxyl terminated polyester of this example, which was identical to Composition A of Example 1, with the exception of the polyester used.

The composition was cast into films and cured as described in Example 1. The properties of the composition were comparable to the properties of Composition A of Example 1.

Example 8

A carboxyl terminated polyester was prepared as described in Example 1 using the following charge:

| | Grams |
|---|---|
| Hydroxyl terminated polyester of Example 6 | 100 |
| Δ⁴-3-carboxy-6-methyl tetrahydrophthalic anhydride | 22.5 |

The carboxyl terminated polyester was a solid having an acid value of 1.83 meq./g.

A composition was formulated, using the carboxyl terminated polyester of this example, which was identical to Composition A of Example 1, with the exception of the polyester used.

The composition was cast into films and cured as described in Example 1. The properties of the composition were comparable to the properties of Composition A of Example 1.

Example 9

A hydroxyl terminated polyester was prepared in a manner described in Example 1 using the following charge:

| | Grams |
|---|---|
| Neopentyl glycol | 287.2 |
| Isophthalic acid | 398.8 |

The hydroxyl terminated polyester had an acid value of 0.12 meq./g. and a hydroxyl value of 1.5 meq./g.

A carboxyl terminated polyester was prepared in a manner described in Example 1 using the following charge:

| | Grams |
|---|---|
| Hydroxyl terminated polyester | 564 |
| Trimellitic acid anhydride | 163.7 |

The carboxyl terminated polyester was a brittle resinous solid having an acid value of 2.47 meq./g.

A composition was formulated, using the carboxyl terminated polyester of this example, which was identical to Composition A of Example 1, with the exception of the polyester used.

The composition was cast into films and cured as described in Example 1.

Example 10

A hydroxyl terminated polyester was prepared in a manner identical to that described in Example 1 using the following charge:

| | Grams |
|---|---|
| Propylene glycol | 236.3 |
| Isophthalic acid | 415.4 |

The hydroxyl terminated polyester had an acid value of 0.03 meq./g. and a hydroxyl value of 1.75 meq./g.

A carboxyl terminated polyester was prepared in a manner described in Example 1 using the following charge:

| | Grams |
|---|---|
| Hydroxyl terminated polyester | 300 |
| Trimellitic acid anhydride | 100.9 |

The carboxyl terminated polyester was a resinous solid having an acid value of 2.66 meq./g.

Example 11

A hydroxyl terminated polyester was prepared in a manner described in Example 1 using the following charge:

| | Grams |
|---|---|
| Propylene glycol | 256 |
| Isophthalic acid | 498.4 |

The hydroxyl terminated polyester had an acid value of 0.08 meq./g., a hydroxyl value of 0.76 meq./g.

A carboxyl terminated polyester was prepared as described in Example 1 using the following charge:

| | Grams |
|---|---|
| Hydroxyl terminated polyester | 300 |
| Trimellitic acid anhydride | 44.4 |

The carboxyl terminated polyester was a resinous solid having an acid value of 1.44 meq./g.

Example 12

Polyesters of different molecular weights were admixed with liquid and solid epoxy resins at the calculated stoichiometric ratio of one carboxyl group to one epoxide group, and also with 0.5 percent by weight, based on the weight of the epoxy resin, of benzyldimethylamine. Each composition was cast as film, 1.2 mils thick on bonderized steel, and cured by heating for 70 minutes at 160° C.

| Polyester | | Cured With Diglycidylether of Cobpositiou A | | Cured With Diglycidylether of Cobposition B | |
|---|---|---|---|---|---|
| Exabple | DP | Ratio* | Impact | Ratio* | Impact |
| 10 | 5.1 | 12/16 | {160 forward<br>{160 reverse | 12/6.2 | {70 forward.<br>{70 reverse. |
| 1 | 7.9 | 52/48 | {160 forward<br>{160 reverse | 75/25 | 30 forward. |
| 11 | 11.2 | 12/8.7 | 30 forward | | |

*Ratio: Polyester/epoxy resin, solids basis xylene as a solvent.

Example 13

A carboxyl terminate polyester was prepared in a manner described in Example 1 using the following reactants:

```
                                              Grams
Isophthalic acid _____ 296.6
Diethylene glycol _____ 210.4
Trimellitic acid anhydride _____  76.2
```

The carboxyl terminated polyester was a viscous liquid which had an acid value of 1.70 meq./g.

One hundred and seventy-three grams of 2-ethoxyethanol were admixed with the polyester yielding a mixture which contained 75 percent by weight non-volatiles.

A composition was then formulated by blending 93.9 grams of this mixture with 19.5 grams of diglycidylether of 2,2-bis(p-hydroxyphenyl)propane and 0.40 cc. of benzyldimethylamine. Film was cast from this composition onto a glass surface and cured by heating for one hour at a temperature of 150° C. The film was comparable in mar resistance to the film of Example 3 and was even more tough and more adherent.

Example 14

This example substantiates that more than 2 carboxy groups per polyester molecule are required for good coating performance.

A carboxyl terminated polyester having a carboxyl functionality of 1.9 and an acid value of 0.96 meq./g. was prepared as described in Example 1 using as reactants:

```
                                              Grams
Hydroxyl terminated polyester of Example 6 ___ 100
Trimellitic acid anhydride _____ 0.38
Phthalic anhydride _____ 13.14
```

α—A carboxyl terminated polyester having a functionality of 3 and an acid value of 1.55 meq./g. was prepared in a manner described in Example 1 using the following reactants:

```
                                              Grams
Hydroxyl terminated polyester of Example 6 ___ 100
Trimellitic acid anhydride _____ 11.82
Phthalic acid anhydride _____  6.74
```

β—A carboxyl terminated polyester having a carboxyl functionality of 5.8 was prepared by first preparing a hydroxyl terminated polyester in a manner described in Example 1 using as the reaction charge:

```
                                              Grams
Trimethylol propane _____  53.68
Propylene glycol _____ 220.5
Isophthalic acid _____ 465.2
```

The hydroxyl terminated polyester had an acid value of 0.11 meq./g. and a hydroxyl value of 2.03 meq./g.

Seventy-five grams of this hydroxyl terminated polyester were reacted with 29.3 grams of trimellitic acid anhydride, in a manner described in Example 1, yielding a carboxyl terminated polyester having an acid value of 2.96 meq./g. and a carboxyl functionality of 5.8.

γ—A carboxyl terminated polyester having a carboxyl functionality of 4.5 and an acid value of 2.28 meq./g. was prepared using the following charge:

```
                                              Grams
Hydroxyl terminated polyester of β _____  75
Trimellitic acid anhydride _____ 15.4
Phthalic acid anhydride _____ 10.7
```

Each of the polyesters noted above were admixed with epoxides at the calculated stoichiometric ratio of one carboxyl group per one epoxide group and with 0.5 percent by weight, based on the weight of the epoxide, of benzyldimethylamine. Each composition was cast as film, 1.2 mils thick on bonderized steel, and cured by heating for one hour at 150° C.

| Polyester | | Cured With Diglycidylether of Composition A | | Cured With Diglycidylether of Composition B | |
|---|---|---|---|---|---|
| Example | Carboxyl Functionality | Ratio* | Impact | Ratio* | Imract |
| Control | 1.9 | 5/2.4 | Too brittle to test. | | |
| Example 7 | 3.74 | 5/4.7 | 160 forward | 5/1.8 | 80 forward. |
| 14-β | 4.5 | 5/5.7 | 160 forward | 5/2.3 | 160 forward. |
| 14-γ | 5.8 | 5/7.4 | 160 forward | 5/2.9 | 120 forward. |
| 14-α | 3.0 | 5/3.9 | 60 forward | | |

*Ratio: Polyester/epoxy resin, solids basis xylene/2-ethoxy ethanol (50:50 parts by weight) as solvent.

In addition all compositions, including the one formulated using polyester of Example 14, had good resistance to toluene and aqueous ammonia.

Example 15

The carboxyl terminated polyester of Examples 3 and 13 were admixed with the diepoxide derivative of cyclohexyl adipate, the diepoxide being used in an amount 50 percent in excess of stoichiometric. Each composition was cast as film on a glass surface and cured in accordance with the following heating cycle: one hour at 100° C., one hour at 150° C.

The films had properties comparable to the film cast from Composition A.

Example 16

A film cast onto bonderized steel from a composition noted below had excellent gloss, excellent mar resistance and a pencil hardness of 4H.

```
                                              Amount, grams
Polyester of Example 1 _____ 2.4
Polyglycidyl ether of a novolac resin _____ 1
Methyl ethyl ketone _____ 2.8
Benzyldimethylamine _____ 0.017
```

The novolac resin which was epoxidized with epichlorohydrin was an oxalic acid catalyzed condensate of phenol and formaldehyde having a molecular weight of about 336 and having 3.2 phenolic hydroxyl groups per molecule.

What is claimed is:

1. A process of producing a carboxyl terminated polyester which consists essentially of reacting a stoichiometric excess of a dihydric compound selected from the group consisting of glycols, phenols, cycloaliphatic diols and ether diols with a compound selected from the group consisting of dicarboxylic cyclic acids, having the formula:

$$R(COOH)_2$$

wherein R is a cyclic hydrocarbon radical having at least 4 carbon atoms, and anhydrides thereof to form a hydroxyl terminated polyester having a DP value of at least about 3 and reacting said hydroxyl terminated polyester with an anhydride of a tricarboxylic acid to produce a carboxyl terminated polyester having a carboxyl functionality of at least about three.

2. A process of producing a curable composition which consists essentially of admixing a polyester as defined in claim 1 with a polyepoxide having an oxirane epoxy equivalency of greater than one.

3. A process of curing the curable composition defined in claim 2 by heating said composition at elevated temperatures.

4. A process as defined in claim 1 wherein the reaction between the hydroxyl terminated polyester and the anhydried of a tricarboxylic acid is conducted at a temperature of at least about 100° C.

5. A process as defined in claim 1 wherein the hydroxyl terminated polyester has a DP value of about 3 to about 25.

6. A process as defined in claim 1 wherein the hydroxyl terminated polyester has a DP value of from about 5 to about 12.

7. A process as defined in claim 1 wherein the dibasic cyclic acid has the general formula:

$$R(COOH)_2$$

wherein R is a cyclic hydrocarbon radical having 6 to 20 carbon atoms.

8. A process as defined in claim 1 wherein the dihydric compound has the general formula:

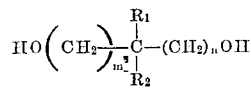

wherein the sum of $n+m$ is at least 1 and $R_1$ and $R_2$ are selected from the group consisting of hydrogen and an alkyl radical containing 1 to 20 carbon atoms inclusive.

9. A process as defined in claim 1 wherein the dihydric compound has the general formula:

$$HO(C_aH_{2a}O)_xH$$

wherein $a$ has a value of 2 to 6 inclusive and $x$ has a value of 1 to 10 inclusive.

References Cited

UNITED STATES PATENTS

| | | | |
|---|---|---|---|
| 3,067,157 | 12/1962 | Bolton et al. | 260—29.2 |
| 3,067,158 | 12/1962 | Bolton | 260—29.2 |
| 3,075,936 | 1/1963 | Bolton | 260—29.6 |
| 2,954,355 | 9/1960 | Young | 260—75 |
| 3,062,770 | 11/1962 | Hirsch | 260—835 |
| 3,223,666 | 12/1965 | Bolton | 260—75 |
| 3,242,142 | 3/1966 | Hyde | 260—835 |
| 3,275,709 | 9/1966 | Wooster | 260—861 |

OTHER REFERENCES

Ward: Correlations, Among Thermal, Electrical and Mechanical Properties of Alkyd-epoxy copolymer, adhesives, I & EC Prod. Res. & Dev., vol 2, No. 2, June 1963.

MURRAY TILLMAN, *Primary Examiner.*

PAUL LIEBERMAN, *Assistant Examiner.*